US011973284B2

(12) United States Patent
Lin

(10) Patent No.: US 11,973,284 B2
(45) Date of Patent: Apr. 30, 2024

(54) CONNECTOR

(71) Applicant: P-TWO INDUSTRIES INC., Taoyuan (TW)

(72) Inventor: Shien-Chang Lin, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 0 days.

(21) Appl. No.: 16/844,019

(22) Filed: Apr. 9, 2020

(65) Prior Publication Data

US 2020/0328539 A1 Oct. 15, 2020

(51) Int. Cl.
*H01R 12/70* (2011.01)
*H01R 12/88* (2011.01)
*H01R 13/627* (2006.01)

(52) U.S. Cl.
CPC ......... *H01R 12/7058* (2013.01); *H01R 12/88* (2013.01); *H01R 13/6272* (2013.01)

(58) Field of Classification Search
CPC .... H01R 4/32; H01R 13/631; H01R 23/7005; H01R 13/64; H01R 13/6456; H01R 12/7058; H01R 12/88; H01R 13/6272
USPC ....... 439/224, 374, 378, 677, 678, 679, 680, 439/681
See application file for complete search history.

(56) References Cited

U.S. PATENT DOCUMENTS 3,714,617 A * 1/1973 Bright ................ H01R 13/6453 439/681
3,997,226 A * 12/1976 Lang .................. H01R 12/7076 439/377
4,934,950 A * 6/1990 Green ................ H01R 13/6453 439/362
5,173,063 A * 12/1992 Barkus ............... H01R 13/6453 439/633
5,356,300 A * 10/1994 Costello ............... H01R 13/631 439/101
6,568,962 B2 * 5/2003 Nakamura ............ H02J 7/0045 439/660
6,939,157 B2 * 9/2005 Chiu ...................... H01R 12/83 439/328
6,945,810 B1 * 9/2005 Morana .............. H01R 12/7005 439/378
7,273,382 B2 * 9/2007 Igarashi ............. H01R 12/7005 439/141
7,422,451 B2 * 9/2008 Chen .................... H01R 13/652 439/101

(Continued)

*Primary Examiner* — Thanh Tam T Le
(74) *Attorney, Agent, or Firm* — Sinorica International Patent & Trademark

(57) ABSTRACT

The present invention discloses a connector that utilizes a first connecting portion includes a plurality of terminals and a latching arm that forms a connection end and utilizes a second connecting portion includes a plurality of terminal slots and an engaging groove that be coupled to the connection end of the first connecting portion. The terminals are electrically connected to the terminal slots and the connecting ends are fastened to the engaging arms, and the terminals are electrically connected to the terminal slots. In a state in which the electrical connection is maintained, the first connecting portion and the second connecting portion are disposed in close to or in the same plane by applying an external force to change the first angle between the first connecting portion and the second connecting portion to the second angle.

12 Claims, 7 Drawing Sheets

(56) References Cited

U.S. PATENT DOCUMENTS

| | | | | |
|---|---|---|---|---|
| 7,621,754 | B2 * | 11/2009 | Costello | H01R 13/7031 439/378 |
| 7,666,025 | B2 * | 2/2010 | Cheng | H01R 12/7088 439/485 |
| 7,727,000 | B2 * | 6/2010 | Minich | H01R 12/7005 439/377 |
| 7,727,001 | B2 * | 6/2010 | Percherke | H01R 12/73 439/378 |
| 8,206,159 | B2 * | 6/2012 | Naito | H01R 12/7082 439/65 |
| 8,292,654 | B2 * | 10/2012 | Yasui | H01R 12/724 439/378 |
| 8,317,535 | B2 * | 11/2012 | Yasui | H01R 12/724 439/378 |
| 8,425,250 | B2 * | 4/2013 | Kagotani | H01R 12/7005 439/374 |
| 9,105,997 | B2 * | 8/2015 | Ohkuma | H01R 12/91 |

* cited by examiner

CONNECTOR

FIELD OF THE INVENTION

The present invention is a technical field of connectors, and more specifically, a connector is capable of board-to-board connection.

BACKGROUND OF THE INVENTION

Traditionally, two printed circuit boards can be connected through a connector in order to transmit signals between two printed circuit boards.

Although it is more convenient that the connector can be connected to two printed circuit boards, it is inevitable that printed circuit boards might detach because of external force in the assembly process. The other circumstance that might happen in the assembly process is that since it is not easy to align the terminals of the connector, the terminals may be damaged and the electrical characteristics of the connector is further affected.

In view of this, the present invention proposes a connector to solve the defects of the traditional connectors.

SUMMARY OF THE INVENTION

The first objective of the present invention is to provide a connector which is capable of performing a connection through a male (or female) type of a first connecting portion and a female (or male) type of a second connecting portion in order to achieve the purpose connecting multiple printed circuit boards.

The second objective of the present invention is to provide a latching arm and a engaging groove, such that the first connecting portion and the second connecting portion can be stably combined and assembled through a combination of the latching arm and engaging groove in accordance with the connector mentioned above.

The third objective of the present invention is that the engaging groove provides an outlet and inlet so that the terminal and the latching arm can be inserted and extracted at an oblique first angle in order to achieve the purpose of assembling or disassembling easily in accordance with the connector mentioned above.

The fourth object of the present invention is that the mechanism of the latching arm and the engaging groove can eliminate the phenomenon of uneven insertion during the connection between the first connecting portion and the second connecting portion in accordance with the connector mentioned above.

The fifth objective of the present invention is that the elastic mechanism of the terminal slot can achieve a floating connection between the first connecting portion and the second connecting portion, and the excessive force will not break the electrical characteristics of the first connecting portion and the second connecting portion during the assembly process in accordance with the connector mentioned above.

The sixth objective of the present invention is that the second connecting portion can provide a single-sided, bilateral or polygonal terminal slots and engaging grooves for connecting the unilateral, bilateral or polygonal terminals and latching arms in accordance with the connector mentioned above.

To achieve the above and other objective, the present invention provides a connector to connect a main board and a sub board. The connector includes a first connecting portion and a second connecting portion. The first connecting portion includes a plurality of terminals and a latching arm. A first accommodating space is formed at the first connecting portion in order to accommodate the plurality of terminals and the latching arms. An end of the plurality of terminals is electrically connected to the sub board. The latching arm is extended from the inside of the first accommodating space to outside of the first accommodating space, and a connecting end is formed at the latching arm outside the first accommodating space. The second connecting portion includes a plurality of terminal slots and an engaging groove. A second accommodating space is formed at the second connecting portion for accommodating the plurality of terminal slot and the engaging groove. An end of the plurality of terminal slots is electrically connected to the main board, and another end of the plurality of terminal slots is electrically connected to another end of the plurality of terminals, and the engaging groove is provided to couple to the connecting end; wherein the first connecting portion is combined with the second connecting portion at a first angle such that the plurality of terminals are electrically connected to the plurality of terminal slots, and in a state in which the plurality of terminals are maintained to be electrically connected to the plurality of terminal slots, the first angle between the first connecting portion and the second connecting portion is changed to a second angle by applying an external force, such that the first connecting portion and the second connecting portion are disposed in close to or in the same plane.

Compared to the previous art, the connector provided by the present invention can be easily installed during the assembly process of the male end portion and the female end portion, and also can avoid the male end portion and the female end portion from disconnecting because of the external force. The present invention provides the male end portion (or the female end portion) to insert into the female end portion (or the male end portion) at an angle in order to perform installing in a small assembly space for example. Furthermore, after the insertion is completed, an angle of the male end portion (or the female end portion) is changed by an external force, and the male end portion and the female end portion can be engaged in the same plane. In the reverse operation of the insertion mention above can also disconnect the male end portion and the female end portion.

DETAILED DESCRIPTION OF THE PREFERRED EMBODIMENTS

In order to fully understand the objectives, features, and advantages of the present invention, the present invention will be described in detail with a description of the present embodiments and the accompanying drawings.

In the present invention, “a” or “an” is used to describe the elements, parts and components described herein. This is done for convenience of description only and providing a general meaning to the scope of the present invention. Therefore, unless clearly stated otherwise, the description should be understood to include one, at least one, and the singular can also includes plural.

In the present invention, the terms “comprising”, “including”, “having”, “containing”, or any other similar terms are intended to encompass non-exclusive inclusive. For example, a component, structure, article, or device that contains a plurality element is not limited to such elements as listed herein but may include those not specifically listed but which are typically inherent to the component, structure, article, or device. In addition, the term “or” means an inclusive “or” rather than an exclusive “or” unless clearly stated to the contrary.

Figure 1:
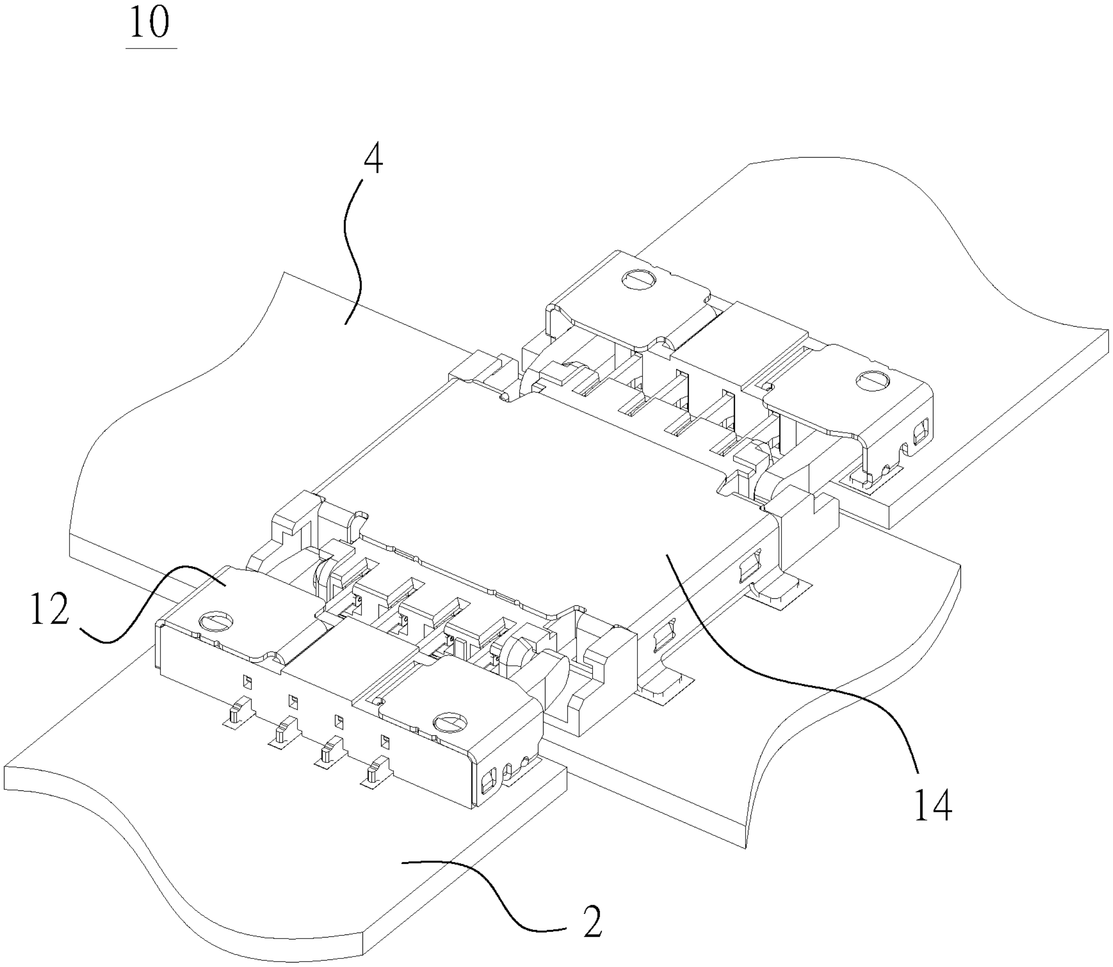
FIG. 1 is a schematic structural view of a connector of the first embodiment in the present invention.

Please refer to FIG. 1, a schematic structural view of a connector of a first embodiment in the present invention. In FIG. 1, the connector 10 is connected to the sub board 2 and the main board 4, and the sub board 2 and the main board 4 may be printed circuit boards. It should be noted that in the present embodiment, the connector 10 connecting to the two sub-boards 2 is exemplified. In other embodiments, the connector 10 may be designed to be connected to only one sub-board 2.

The connector 10 includes a first connecting portion 12 and a second connecting portion 14. In the present embodiment, the first connecting portion 12 and the second connecting portion 14 are described by taking a male end type and a female end type respectively as an example, as long as the first connecting portion 12 and the second connecting portion 14 can be connected.

Figure 2:
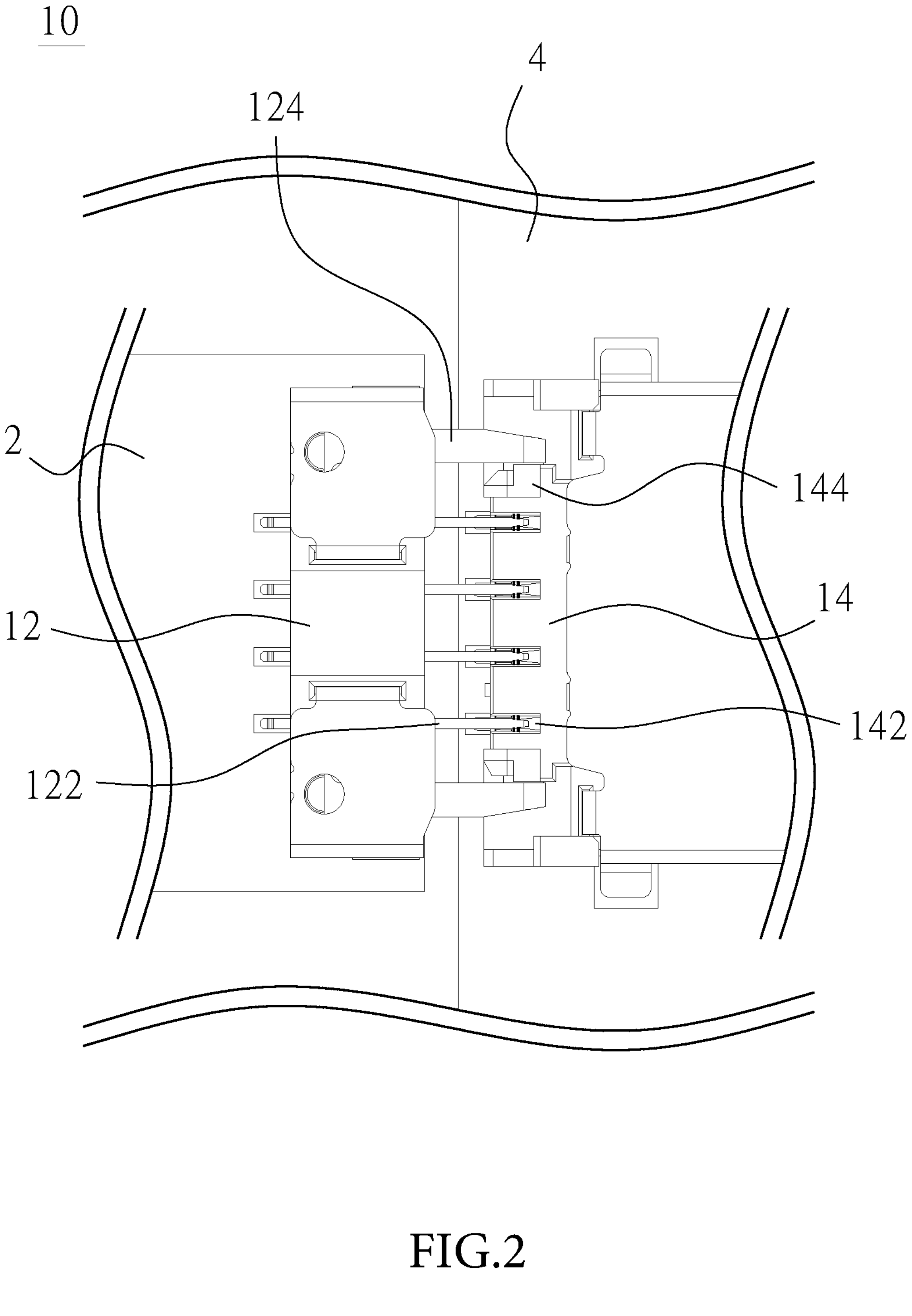
FIG. 2 is a top view illustrating the connector in FIG. 1 of the present invention.
Figure 3:
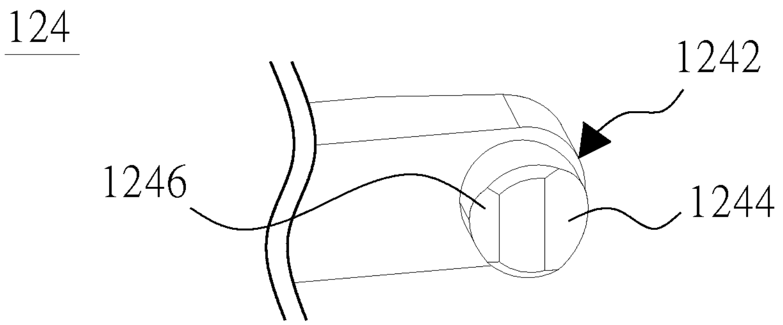
FIG. 3 is a schematic structural view illustrating the latching arm of FIG. 1 in the present invention.

Refer to FIG. 2 together, a top view of the connector of FIG. 1, the present invention. In FIG. 2, the first connecting portion 12 includes four terminals 122 and two latching arms 124. A first accommodating space is formed at the interior of the first connecting portion 12 for accommodating the plurality of terminals 122 and the latching arm 124. Moreover, an end of the plurality of terminals 122 is electrically connected to the sub-board 2 for transmitting the electrical signals of the sub-board 2. For example, an end of the plurality of terminals 122 may be fastened to the sub-board 2 through soldering or other ways. An end of the latching arm 124 is fastened into the first accommodating space, and another end is extended from the inside of the first accommodating space to the outside of the first accommodating space. Wherein a connecting end 1242 (refer to FIG. 3 together) is formed at the latching arm 124 outside the first accommodating space, and the connecting end 1242 is extended toward the terminal 122. The latching arm 124 with the connecting end 1242 has a structure shape similar to the L-shaped. In this embodiment, the latching arm 124 are disposed on two sides of the four terminals 122 and the shape of connecting end 1242 may be cylinder. It should be noted that the connecting end 1242 further includes an insertion bevel 1244 and an exit bevel 1246. In the present embodiment, the insertion bevel 1244 is formed at a front edge of the connecting end 1242 and the exit bevel 1246 is formed at the trailing edge of the connecting end 1242. An area of the insertion bevel 1244 is larger than an area of the exit bevel 1246 so that the latching arms 124 is smoothly slid into the engaging groove 144 or exited from the engaging groove 144. In addition, according to the direction of the inclination of the insertion bevel 1244 and the exit bevel 1246, an angle of the connecting end 1242 being inserted or exited may be determined through matching an outlet and inlet 1442 of the engaging groove 144.

The second connecting part 14 includes four terminal slots 142 and a engaging groove 144.

Figure 8:
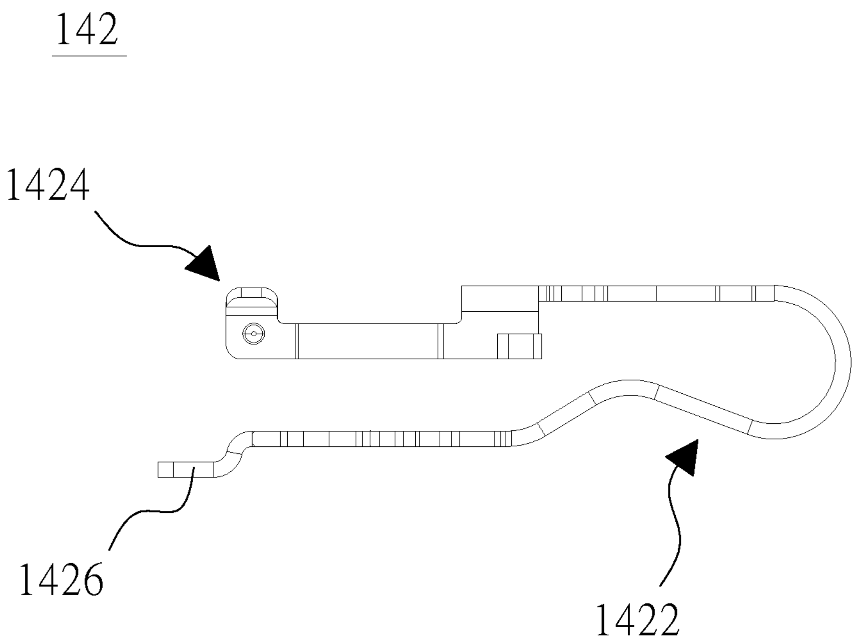
FIG. 8 is a side cross-sectional view illustrating the terminal slot of FIG. 1 in the present invention.
Figure 9:
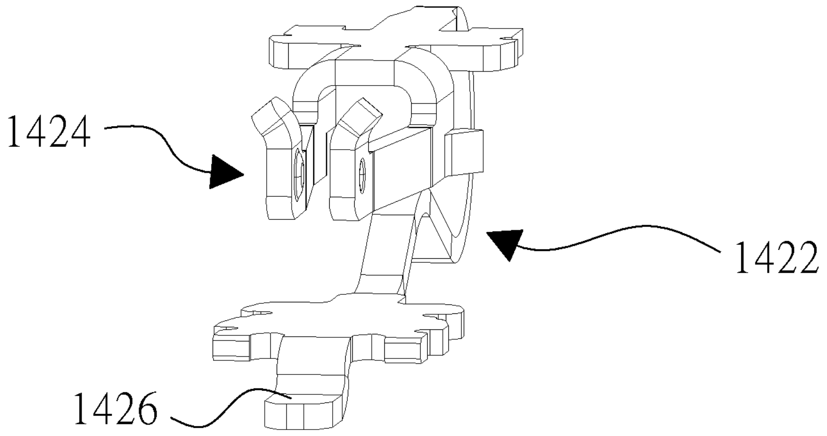
FIG. 9 is a perspective view illustrating the terminal slot of FIG. 1 in the present invention.

A second accommodating space is formed at the second connecting part 14 in order to accommodate the four terminal slots 142 and the engaging grooves 144. Refer to FIG. 8 together, a side cross-sectional view of the terminal slot of FIG. 1 of the present invention. In FIG. 8, an end 1426 (referred to as a fastening portion) of the four terminal slots 142 are electrically connected to the main board 4 respectively in order to transmit the electrical signal of the main board 4, another end 1424 (called contact portion) of the four terminal slots 142 is electrically connected to another end of the terminal 122. Moreover, the terminal slot 142 further has an elastic portion 1422 disposed between the fastening portion 1426 and the contact portion 1424, and a shape of the elastic portion 1422 is a curved shape with multi-curved surface in order to provide an elastic force through a floating structure formed by a single end connecting of the fastening portion 1426 when the terminal 122 is contacted with the terminal slot 142, so that the connection is facilitated. In the present embodiment, refer to FIG. 9 together, a perspective view of the terminal slot of FIG. 1 in the present invention. In FIG. 9, the contact portion 1424 is a clip-on structure (for example, a Y-shape), and a connection area of the clip-on structure in the Z-axis direction is larger, which is advantageous for the combination without being subjected to the aforementioned insertion angle or separation angle. In other words, the electrical connection can still be maintained during the change of the angle.

Figure 4:
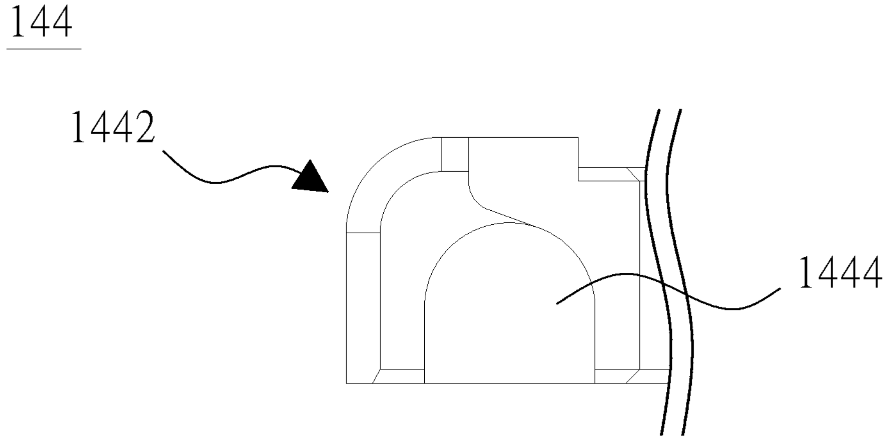
FIG. 4 is a schematic structural view illustrating the engaging groove of FIG. 1 in the present invention.
Figure 5:
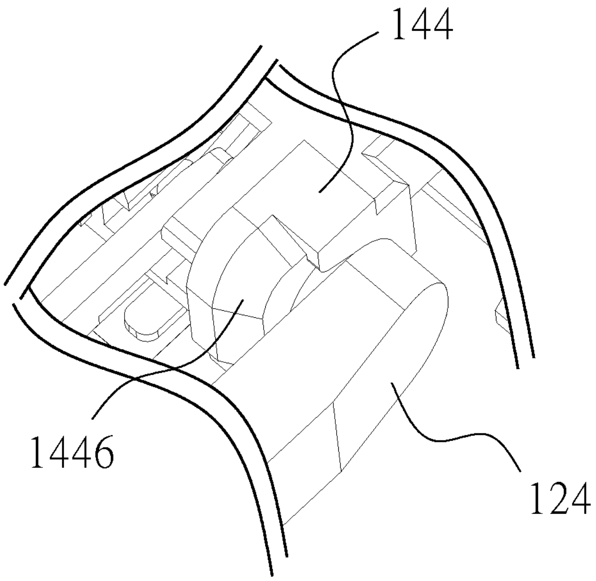
FIG. 5 is a schematic coupling view illustrating the engaging groove and the connecting end of FIG. 1 in the present invention.

The engaging groove 144 can match with the connecting end 1242. Refer to FIG. 4 together, a schematic structural view of the engaging groove of FIG. 1 in the present invention. In FIG. 4, the shape of the engaging groove 144 is exemplified by a cylindrical groove for matching the connecting end 1242 of the cylinder. If a distance of the outer edge of the engaging groove 144 is greater than or equal to a distance between two tops of the connecting end 1242, the connecting end 1242 will be confined to the engaging groove 144. An outlet and inlet 1442 and a rotation opening 1444 are formed at the engaging groove 144. The outlet and inlet 1442 is connected with the rotation opening 1444. An opening of the outlet and inlet 1442 allows the latching arm 124 to be inserted and extracted at a first angle θ1. In other words, the latching arm 124 may be inserted obliquely. Since a rotating space is provided by the rotation opening 1444, it can not only allow the connecting end 1242 to be accommodated, but also the connecting end 1242 of the cylinder to be freely rotated in the rotation opening 1444. Refer to FIG. 5 together, the illustration of the coupling diagram of the engaging groove and the connecting end of FIG. 1 in the present invention. In FIG. 5, a joint surface 1446 is formed additionally at the engaging groove 144 in order to enable the connecting end 1242 to be slid into the rotation opening 1444 or to be slid out from the rotation opening 1444.

Figure 6:
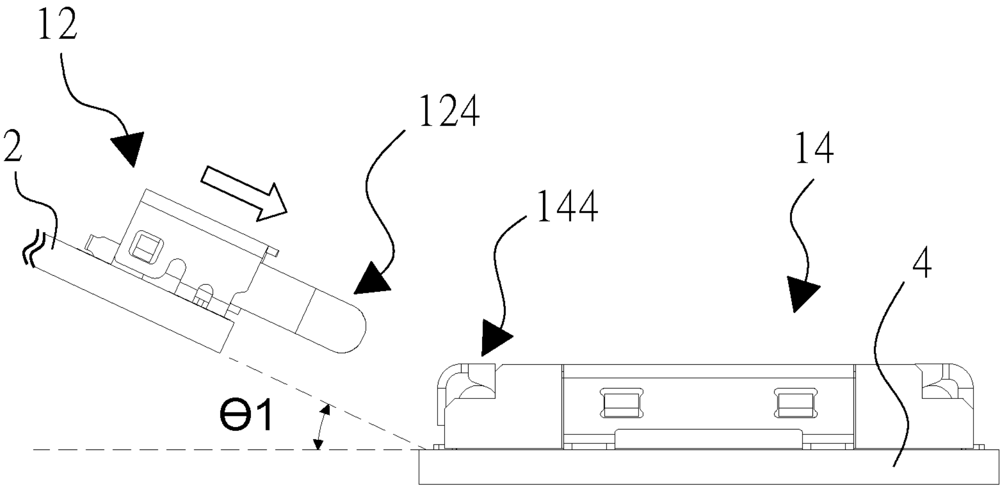
FIG. 6 and FIG. 7 are schematic views illustrating a connecting state of the first connecting portion and the second connecting portion of FIG. 1 in the present invention
Figure 7:
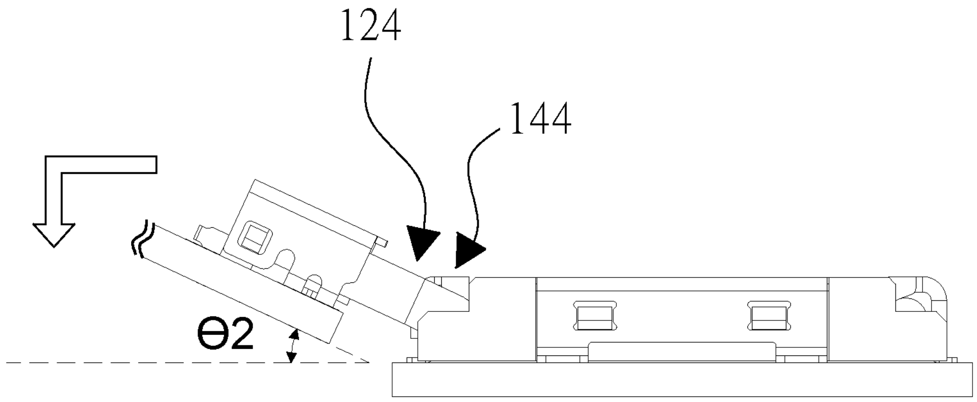

Refer to FIG. 6 and FIG. 7 together, a schematic view of a combination state of the first connecting portion and the second connecting portion of FIG. 1 in the present invention. Wherein in FIG. 6, it shows the first connecting portion 12 is inserted into the outlet and inlet 1442 at a first angle θ1, and after inserting into the rotation opening 1444, the first connecting portion 12 is combined with the second connecting portion 14 through the latching arm 124 and the engaging groove 144, such that the four terminals 122 are electrically connected to the four terminal slots 142, the connecting end 1242 and the latching arm 124 are engaged. In addition, in a state the four terminals 122 electrically connected to the four terminal slots 142 is maintained, the first angle θ1 between the first connecting portion 12 and the second connecting portion 14 is changed to a second angle θ2 by applying an external force, and the first connecting portion 12 and the second connecting portion 14 are close to or in the same plane.

Figure 10:
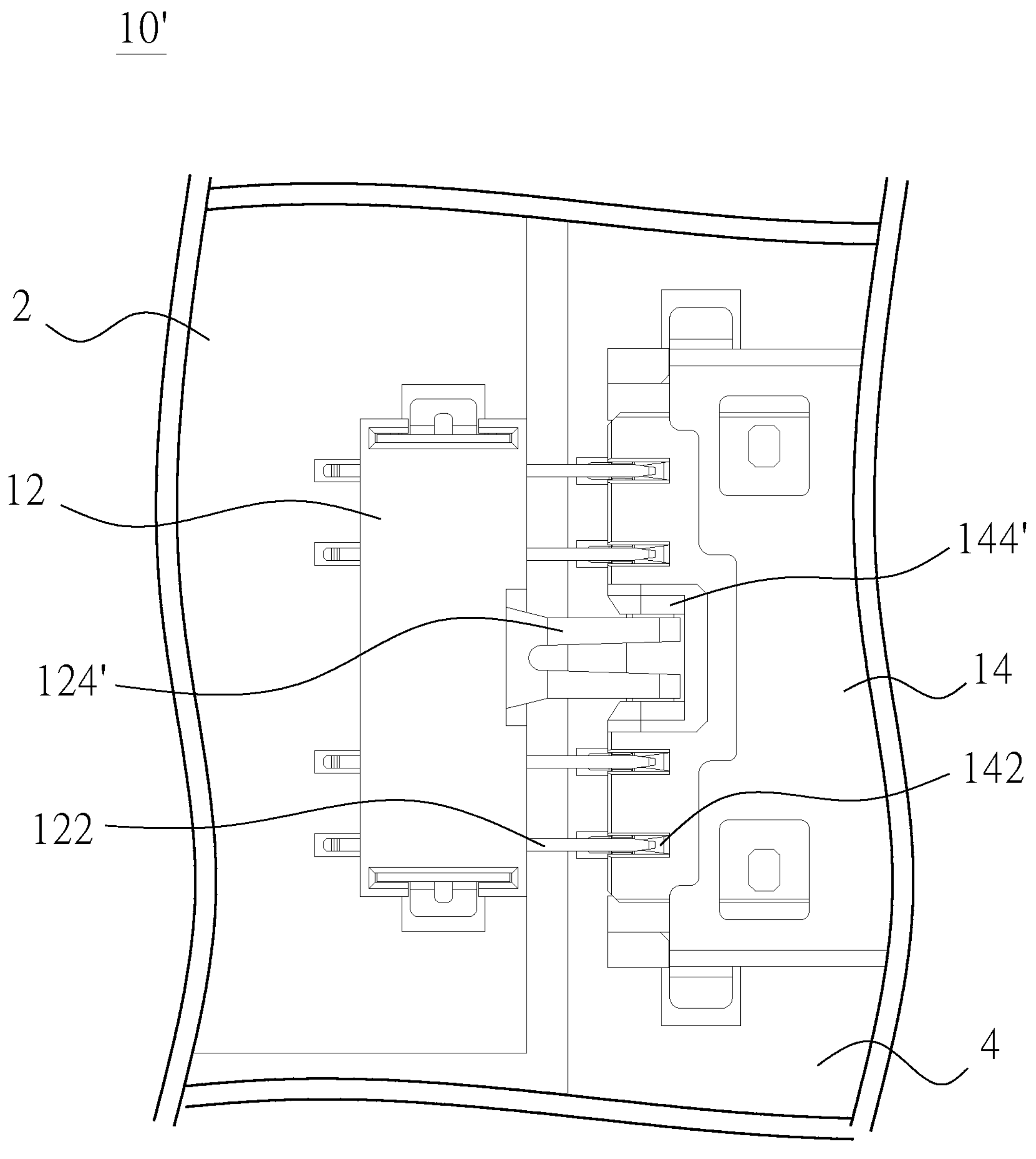
FIG. 10 is a schematic structural view illustrating a connector of a second embodiment in the present invention.

Please refer to FIG. 10, a schematic structural view of a connector according to a second embodiment of the present invention. In FIG. 10, the connector 10' includes a first connecting portion 12' and a second connecting portion 14', the difference thereof from the first embodiment is a different position the latching arms 124' and the engaging grooves 144' disposed.

In the present embodiment, the latching arm 124' is disposed between the intermediate two terminals 122, and the connecting end 1242 is oriented toward the terminals 122. If a distance between the two inner edges of the engaging grooves 144' is less than or equal to the distance between the tops of the two connecting ends 1242, the latching arms 124' may be restrained to the engaging grooves 144'.

Figure 11:
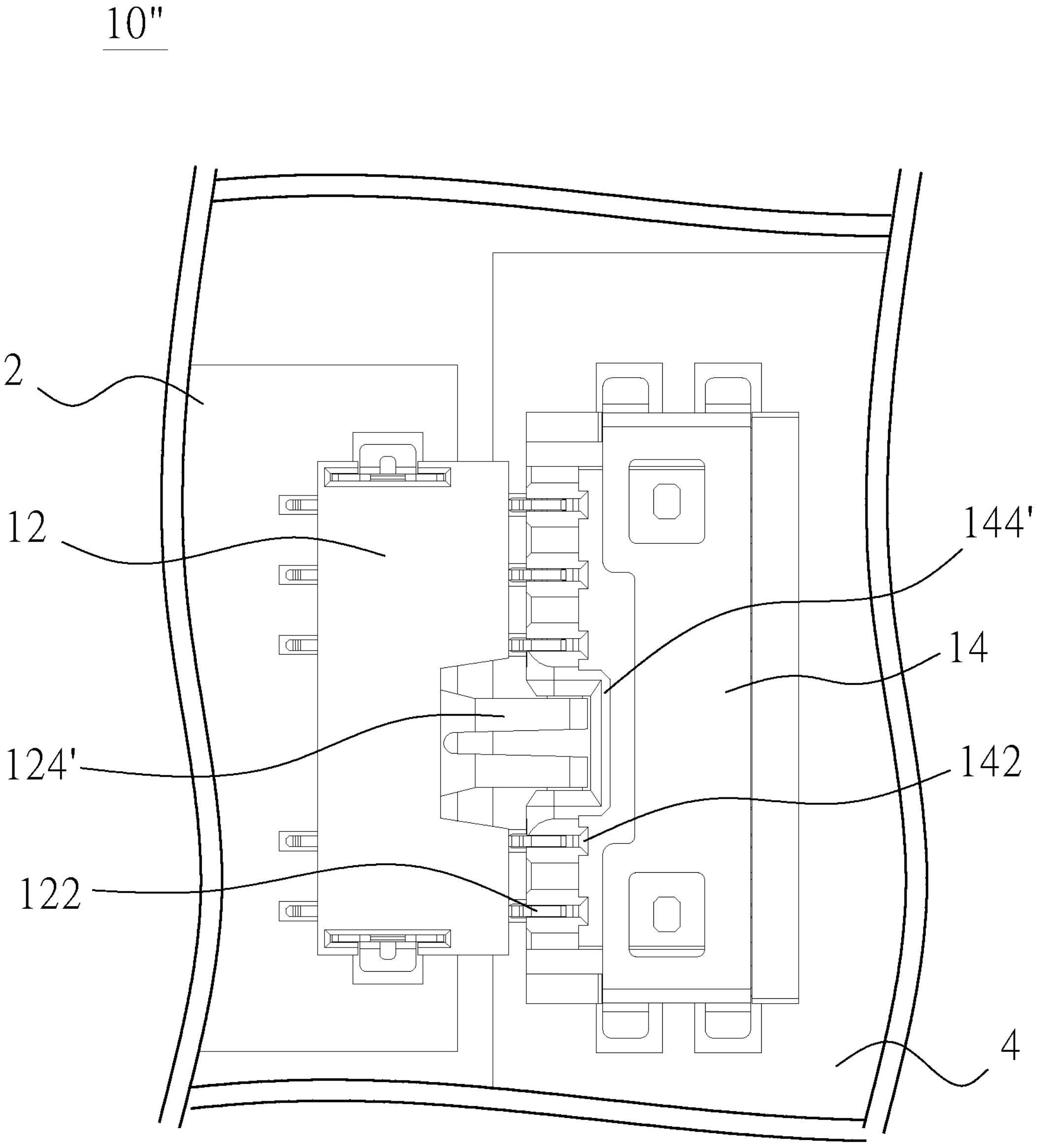
FIG. 11 is a schematic structural view illustrating a connector of a third embodiment in the present invention.

Please refer to FIG. 11, a schematic structural view of a connector according to a third embodiment of the present invention. In FIG. 11, the connector 10" also has the first connecting portion 12' and the second connecting portion 14' mentioned in the second embodiment, the difference thereof from the second embodiment is the quantity of the terminals 122 of the second embodiment is adjusted from the even number (4) to an odd number (5). For the convenience of description, the type of the even-numbered terminal 122 in the second embodiment is referred to as a symmetric terminal, and a type of the odd-numbered terminal 122 in the third embodiment is called an asymmetrical terminal. However, regardless of the implementation of the symmetrical terminal or the implementation of the asymmetric terminal, the engaging groove 144' does not appear on the two sides of the second connecting end 14 (this belong to the first embodiment) uniquely. The engaging groove 144' appears between any two terminals 122. In other words, regardless of whether the engaging groove 144' appears at the center of the second connecting end 14 or between the two sides and the center, it is all fallen into the scope of the present invention. It should be noted that the position of the latching arm 124' is arranged corresponding to the engaging groove 144'.

The present invention has been disclosed with a preferred embodiments in the foregoing paragraphs, and it should be understood by those skilled professionals in the field that the present invention is not intended to limit the scope of the present invention. It should be noted that variations and permutations equivalent to the present embodiments are intended to be fallen into the scope of the present invention. Therefore, the scope of protection of the present invention is defined by the scope of the patent application.

What is claimed is:

1. A connector connecting a main board and a sub board, the connector comprises:

a first connecting portion with a plurality of terminals and a latching arm, and a first accommodating space is formed at the first connecting portion in order to accommodate the plurality of terminals and the latching arm, an end of each of the plurality of terminals is electrically connected to the sub board, the latching arm is extended from an inside of the first accommodating space to an outside of the first accommodating space, and a connecting end is formed at the latching arm outside the first accommodating space; and a second connecting portion with a plurality of terminal slots and an engaging groove, and a second accommodating space is formed at the second connecting portion in order to accommodate the plurality of terminal slots and the engaging groove, an end of each of the plurality of terminal slots is electrically connected to the main board, and another end of the plurality of terminal slots is electrically connected to another end of the plurality of terminals, and the engaging groove is provided to couple to the connecting end;

wherein the first connecting portion is combined with the second connecting portion at a first angle such that the plurality of terminals are electrically connected to the plurality of terminal slots, and in a state in which the plurality of terminals are maintained to be electrically connected to the plurality of terminal slots, the first angle between the first connecting portion and the second connecting portion is changed to a second angle by applying an external force, such that the first connecting portion and the second connecting portion are disposed in close to or in a same plane; and wherein an insertion bevel and an exit bevel are further formed at the connecting end, the insertion bevel is formed at a front edge of the connecting end and the exit bevel is formed at a trailing edge of the connecting end, the latching arm is coupled to the connecting end when the insertion bevel is slid into the engaging groove, and the latching arm is disconnected from the connecting end by the exit bevel.

2. The connector according to claim 1, wherein an area of the insertion bevel is not less than an area of the exit bevel.

3. The connector according to claim 1, wherein the latching arm comprises two latching arms respectively disposed onto two sides of the plurality of terminals, and the connecting end is oriented toward the plurality of terminals, and wherein the engaging groove comprises two engaging grooves-disposed onto two sides of the second connecting portion in order to correspond to the latching arms.

4. The connector according to claim 3, wherein a quantity of the connecting end is two, a distance of an outer edge of the engaging groove is not less than a distance between the tops of the two connecting ends.

5. The connector according to claim 1, wherein the latching arm is disposed between any two of the plurality of terminals, and the connecting end is oriented toward the plurality of terminals, and the engaging groove is disposed between any two of the plurality of terminal slots of the second connecting portion in order to correspond to the latching arm.

6. The connector according to claim 5, wherein a quantity of the connecting end is two, and a distance of an inner edge of the engaging groove is not greater than a distance between the tops of the two connecting ends.

7. The connector according to claim 1, wherein an outlet and inlet and a rotation opening are formed at the engaging groove, the outlet and inlet is connected to the rotation opening, an opening of the outlet and inlet is provided for inserting and extracting at the first angle by the plurality of terminals and the latching arm, and the rotation opening is provided for accommodating the connecting end.

8. The connector according to claim 7, wherein the outlet and inlet is formed to be a joint surface such that the connection end slides into the rotation opening or slides out from the rotation opening.

9. The connector according to claim 1, wherein an elastic portion, a contact portion and a fastening portion are formed at each terminal slot, and the elastic portion is formed between the contact portion and the fastening portion, the contact portion is connected to each terminal, the elastic portion provides an elastic force to feed back the terminal, and the fastening portion is for stabilizing each terminal slot to the main board.

10. The connector according to claim 9, wherein the contact portion is a clip-on structure in order to electrically connect each terminal and the contact portion by clipping each terminal.

11. The connector according to claim 1, wherein a shape of the connecting end is cylinder shape and a shape of the engaging groove is cylindrical groove shape.

12. The connector according to claim 1, wherein the second connecting portion further includes another plurality of terminal slots and another engaging groove for connecting to another first connecting portion.

* * * * *